May 17, 1932.    T. A. BANNING, JR    1,858,610
REFRIGERATION AND STORAGE AND CARRIAGE OF
GASOLINE AND OTHER VOLATILE MATERIALS
Filed April 16, 1928    4 Sheets-Sheet 3

Inventor:

May 17, 1932.  T. A. BANNING, JR  1,858,610
REFRIGERATION AND STORAGE AND CARRIAGE OF
GASOLINE AND OTHER VOLATILE MATERIALS
Filed April 16, 1928   4 Sheets-Sheet 4

Patented May 17, 1932

1,858,610

UNITED STATES PATENT OFFICE

THOMAS A. BANNING, JR., OF WILMETTE, ILLINOIS, ASSIGNOR TO DRYICE EQUIPMENT CORPORATION, OF NEW YORK, N. Y., A CORPORATION OF DELAWARE

REFRIGERATION AND STORAGE AND CARRIAGE OF GASOLINE AND OTHER VOLATILE MATERIALS

Application filed April 16, 1928. Serial No. 270,352.

This invention relates to refrigeration including the storage and carriage of volatile liquids such as gasoline, naphtha, casing head gasoline, and the like, and it has reference especially to improvements calculated to reduce or eliminate both the fire-hazard and the loss of such liquids due to evaporation and the like. The features of the invention concerning the specific application thereof to the storage and carriage of liquids have been devised with particular reference to the carriage of such liquids in tank cars over railroads, but it will presently appear that said features may also be used to advantage in connection with other refrigeration and also the storage of such liquids in stationary tanks such as are used at railway terminals, and in towns and cities where the liquids are received, and at stations from which they are distributed. Said features may also be used to advantage in connection with tanks used at refineries, etc., and in many other locations which will suggest themselves from time to time. Inasmuch as I have devised the features of the invention with particular reference to the conditions existing in the operation of tank cars, and have illustrated such use and arrangement herein, I will now describe said features with especial reference to such use, but in so doing I wish it understood that I do not intend thereby to limit the usefulness or protection of the invention thereto, except as I may do so in the claims.

With the foregoing in mind, it will be understood that when a tank car has been filled with the volatile liquid, for example, gasoline, at a certain temperature, as the temperature of said liquid rises there is an expansion thereof in volume, and also when the temperature reaches a certain point the evaporation from the surface of the body of liquid in the car becomes of importance both from the standpoint of loss due to evaporation, and also from the standpoint of fire-hazard.

The tank cars are generally provided with domes on their top central portions, said domes extending upwards a sufficient distance to provide a chamber within which the liquid may rise in case the tank-car was originally completely filled up to the position of the dome, and said domes are also provided with valves whereby the gas pressure may be relieved when it becomes excessive, thus preventing danger from the standpoint of excessive pressure. It is desirable to so operate the tank cars that even when the liquid has expanded to its maximum degree it will not rise up into the dome, thus leaving the dome clear and unoccupied except by the vapors and air.

These domes are also generally provided with man-holes which can be closed in gas tight manner by suitable covers when the tank has been filled. These man-holes when opened also permit insertion of pipes or hose through which the liquid may be introduced into the tank, or through which said liquid may be pumped out when it is desired to withdraw the liquid through the top of the tank instead of at its bottom. Usually these man-hole covers are held in place by bolts or nuts which must be either completely or partially removed in order to remove the man-hole covers.

It sometimes happens that the pressure generated within the tank due to expansion of the vapors and generation of new vapors with rise of temperature is not properly relieved by reason of the valves sticking closed, and in such case when the cover is removed from the man-hole the pressure is suddenly relieved, and damage has been caused thereby. In fact, in some cases such removal of the cover when under pressure has been so violent that sparks have been generated, and disastrous fires have ensued in the case of such inflammable liquids as gasoline, naphtha, etc.

The sealing of the domes in such a manner as to prevent exit of the vapors will of course prevent loss thereof, but such sealing is highly dangerous not only from the standpoint of the actual pressure which may be generated with the tank, and for which pressure said tank was not designed nor intended, but also is dangerous from the standpoint of the fire-hazard which will ensue when the dome is finally opened in order to either withdraw the liquid or for other reason.

It is also evident that when the pressure within the dome and within the tank proper is held only slightly above atmospheric, the loss due to evaporation in warm or hot weather will be large, and will increase rapidly with rise of temperature of the body of the tank. In fact, in very hot weather it sometimes happens that there will be actual ebullition from the surface of the gasoline at the position of the dome, with corresponding very rapid loss of fuel in vaporous form.

According to one feature of my invention I propose to cool the dome or other local portion of a tank or tank car so as to reduce the loss due to evaporation, and I propose to do this by the use of an evaporating refrigerating agent which is in itself absolutely non-inflammable, so as to eliminate the fire-hazard. Such an agent is solid carbon-dioxide which has a freezing point of about −110 degrees Fah. and which passes or sublimates directly from the solid to the gaseous or vaporous state without becoming a liquid. It may be secured in quantities and at low cost commercially, and weighs from 70 to 90 pounds per cubic foot depending on the process by which it is produced. It may also be secured as a loose "snow" prior to being compacted. Carbon-dioxide is much heavier than air, when the carbon-dioxide is in the gaseous form, and it will settle down to the lower portions of a container. Thus it will settle down onto the surface of the gasoline or other liquid which may be contained within the tank-car. Furthermore, the carbon-dioxide is absolutely non-inflammable, since it is fully oxidized carbon, and gasoline and other liquids which are highly inflammable in the presence of air are absolutely non-combustible in the presence of carbon-dioxide. Consequently, the presence of a layer of carbon-dioxide gas on the surface of the body of the gasoline in the tank-car will completely prevent danger due to combustion or excessive temperature.

According to one feature of my invention I propose to place a suitable body of said agent in the dome of the tank-car or other tank, and above the level of the contained gasoline, and I also preferably heat insulate the dome so that excessive loss of cooling action may be prevented. If desired the solid carbon-dioxide may be placed within a can or other suitable container having a hole or holes through which the carbon-dioxide gas may flow as fast as generated and thus find its way into the space of the dome and other spaces in the top portion of the tank-car and above the level of the gasoline therein. In other cases the solid carbon-dioxide may be placed in a basket or other container, or even left unprotected within the dome of the tank-car, there being provided, however, suitable means for supporting the solid-carbon-dioxide within the dome and above the level of the gasoline therein.

Due to the fact that the solid carbon-dioxide has a temperature greatly below that of the body of gasoline and gases within the tank-car and dome, there will take place a slow evaporation and sublimation of the solid carbon-dioxide, the gas thus generated will be extremely cold and will settle down against the top surface of the body of the gasoline which is in the tank, correspondingly displacing the air from the space above the gasoline, and said air will be discharged from the dome through the vent valves thereof. This action will take place until all of the air has been eliminated after which time further generation of carbon-dioxide gas will be accompanied with delivery of corresponding amounts of such gas out through the vent valves. It is noted that the gases including the gaseous carbon dioxide which are thus delivered out through the vent valves of the dome will flow up close to the wall of the dome until the vent valve or valves are reached, the freshly sublimated carbon dioxide settling downwards in the central part of the dome, then flowing sidewise and then upwardly close to the inner face of the wall to the point of exit, namely, the vent valve.

The low temperature of the body of solid carbon-dioxide as well as of the gaseous carbon-dioxide as generated, will effectively chill the dome and the upper portion of the body of gasoline. Inasmuch as the only point of exit for gasoline or other vapors is through the dome to the vent valves it follows that any such vapors rising into the dome will be immediately condensed back into the liquid form and will fall back into the body of the tank and be reentered into the body of gasoline therein. It is thus evident that it will be impossible for any of the gasoline to be lost through the dome and vent valves by evaporation as long as this condition exists.

It will be found that the latent heat of vaporization of the solid carbon-dioxide into the gaseous form, together with the heat necessary to raise the temperature of the gas as generated, from its initial point of approximately 110 degrees below zero up to, say 60 degrees above zero, will correspond to a condensation of a very considerable amount of gasoline from its vaporous form back to the liquid at that temperature, and in fact the ratio will be substantially more than two to one by weight; that is, for each pound of carbon-dioxide vaporized there will be condensed substantially more than two pounds of gasoline. It thus follows that a very great benefit will be secured in the sense that a relatively small amount of the solid carbon-dioxide will be sufficient to completely prevent any loss of gasoline by evaporation.

The tendency for the gasoline to be lost by evaporation will also be reduced by reason of other circumstances. Among these is the fact that the presence of one gas or vapor in the air will greatly reduce the rate of evaporation of another gas or vapor into the same body of air. That is to say, by filling the space above the gasoline with inert gas such as carbon-dioxide gas, the tendency of the gasoline to evaporate through said body of inert gas will be greatly reduced or slowed up, so that even aside from the fact that there will be an actual condensation of gasoline vapor into liquid form due to low temperature, there will be a great reduction of rate of evaporation due to the presence of the carbon-dioxide gas.

For the above reason it follows that even after all of the available solid carbon-dioxide may have been evaporated into gaseous form with complete consumption of cooling effect, there will nevertheless remain a very beneficial effect from the presence of the gaseous carbon-dioxide layer above the body of the gasoline due both to the non-inflammable nature of said carbon-dioxide, and also due to the above retarding action on the rate of evaporation.

A further feature of this invention relates to an improved form and arrangement of container for the solid carbon dioxide. This container is so constructed as to establish a pocket or receptacle in which the refrigerant is contained, said receptacle being gas tight up to a level higher than the ordinary level of the solid carbon dioxide contained therein so that in normal operation the solid carbon dioxide is submerged in cold carbon dioxide gas freshly evolved by sublimation, and substantially free from air, the container being formed for escape of gas only by outflow from a higher level than the ordinary level of the solid carbon dioxide contained therein; and a further feature relates to the provision of a downflow conduit leading from the upper portion of the interior of the container to lead the outflowing gas downwardly by gravitation to a point below the container, the upper portion of the container being sealed against the ingress of air so that the sublimation of the solid carbon dioxide contained within the container is not influenced by any "washing" or "bathing" due to inflow of air or gas into the container but said sublimation is due solely to heat conducted to the solid carbon dioxide through the walls of the container.

A further feature relates to the provision of an arrangement in which the carbon dioxide gas is compelled to flow upwardly to a delivery or discharge opening located at an elevation above the level at which it ceases to flow down in the conduit aforesaid so that heat penetrating through the walls of the receptacle is caught by this upflowing carbon dioxide gas and is carried out of the receptacle through the delivery or discharge opening aforesaid whereby the receptacle is rid of such inflowing heat.

In the appended drawings which constitute a part of this specification I have shown one embodiment of the features of my invention.

Figure 1:
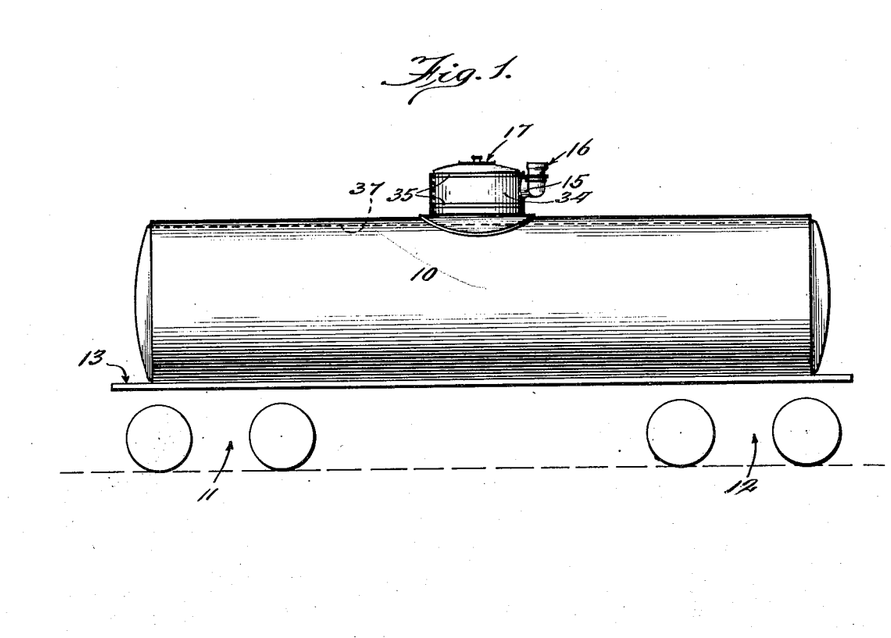
Fig. 1 shows a side elevation of a tank-car equipped with means for making use of the features of the present invention.

Referring first to Fig. 1, the same illustrates a tank-car of familiar form, the same being provided with the main tank 10, trucks 11 and 12, platform 13, etc. The dome is shown at 14. It is provided with one or more vent fixtures 15, generally extending upwards and on the top of said fixtures are connected the vent valves such as 16. Generally there are two of these fixtures and valves, one of which allows air to enter the tank in case of reduction of the volume of liquid therein, and other of which allows the contained gas or vapor within the tank to escape in case of rise of pressure beyond a predetermined amount say 25 lbs. per square inch. This valve constitutes in effect a safety valve operating at a certain upper limit to allow vapor to flow out from the dome and thus relieve or prevent excessive pressure. Furthermore, the gas reaching the vent fixture 15 flows to the same upwardly adjacent to the wall of the dome. These devices are generally and widely used in the art and they are well known and understood.

Generally, also the dome is provided with a man-hole which is closed in gas tight manner by a cover 17. This cover may be secured in place in any convenient manner, but it is removable to give access to the interior of the tank through the dome. This cover is also generally of considerable size so that when removed it exposes the man-hole opening of sufficient size to allow a man to easily climb into and out of the tank, and for other purposes.

Figure 2:
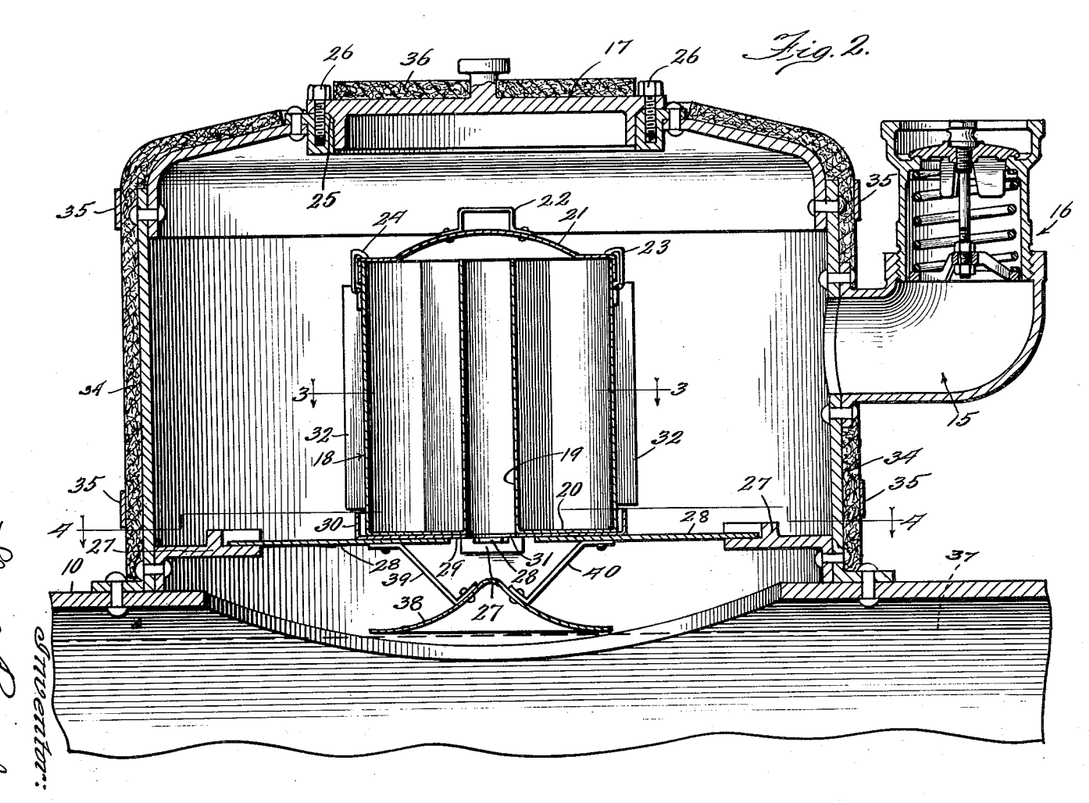
Fig. 2 shows a vertical section through the dome and immediately related parts of the car, on enlarged scale as compared to Fig. 1.
Figures 3, 4:
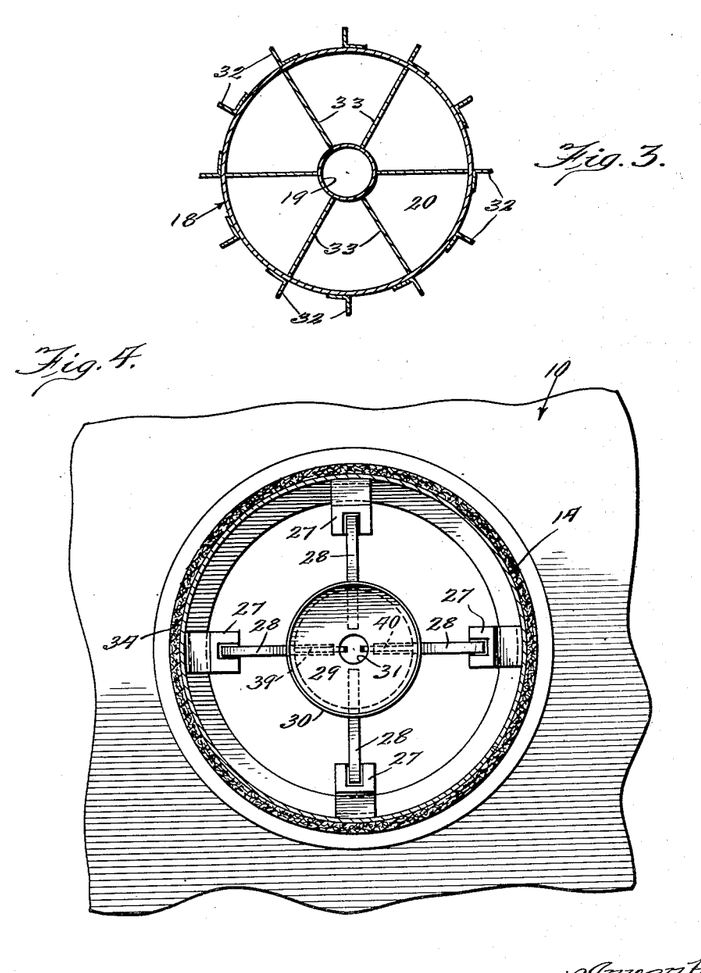
Fig. 3 shows a horizontal section through the can for the solid carbon-dioxide, the can being of the general form of that shown in Fig. 2, and Fig. 3 being taken on the line 3—3 of Fig. 2, looking in the direction of the arrows.
Fig. 4 shows a horizontal section through the dome, being taken on the line 4—4 of Fig. 2, looking in the direction of the arrows, and showing one form of support for the can.

According to one feature of my invention I propose to place within the dome a body of such refrigerating and fire-preventative material as solid carbon-dioxide. This body of material may be supported within the dome in any convenient manner, and with or without a local enclosure for it. In the arrangement of Fig. 2 I have provided a local enclosure or container in the form of a can 18, preferably of circular form as shown in Fig. 3. This can is provided with a central downwardly extending vertical passage 19 communicating through the floor 20, of the can. Said passage is open at its upper end and communicating with the interior of the container, and the cover 21 for the can is so formed or related to the upper end of this passage that said upper end is open and unobstructed, and allows a free flow of vapors or gases from the interior of the can downwardly through the passage and out at the lower end thereof.

For the above purpose the cover is provided with a downwardly extending flange around its edge which overlies the upper end of the can; and the central portion of the cover is crowned upwardly a substantial amount as shown in Fig. 2 to leave the desired clearance above the passage 19. Thus the passage 19 serves to transfer the carbon dioxide gas sublimated in the container downwardly to deliver said gas below the container. The cover may be provided with a handle 22; and there is also preferably provided one or more suitable means for attaching the cover to the body of the can so that when the cover is raised by the handle 22 the can and contents will also be raised. Thus for example, the clips 23 and 24 may be provided for attaching the cover to the can body.

The opening 25 in the top of the dome is of such size as compared with the size of the can that the latter may be easily inserted or removed through said opening. The dome cover 17 is shown as being held in place by means of tap screws or bolts 26, but manifestly, any other suitable form of connection may be used.

The can when set into place in the dome is supported therein in any convenient manner. In the arrangement of Fig. 2 I have provided several brackets 27 located around the interior of the dome and connected thereto and reaching into the body thereof. These brackets are recessed on their top faces to receive the arms 28 which reach outwardly from a central plate 29 which they support. Said plate 29 is of proper size to receive the can and support the same. The plate 29 is also preferably provided with an encircling upturned flange 30 which is of proper size to receive the lower portion of the can and retain the same against sidewise displacement. This will prevent the can from being displaced due to bumping and jarring of the car when on the road, and will also retain the central portion of the can properly centered with respect to the plate 29.

Said plate 29 is provided with a central opening 31 of proper size to register with the lower end of the passage 19 of the can so that the gases and vapors may freely flow downwardly therethrough.

In some cases it may be found desirable to increase the heat transferring ability of the outer wall of the can. In such event said outer wall may be provided with a series of more or less vertical outwardly extending flanges 32, conveniently in the form of short sections of angle iron riveted or welded to the outer face of the can. Such flanges when used should not interfere with the cover flange, nor with the upstanding flange 30 of the plate 29.

In case it should be desired to improve the transference of heat from the inner face of the can to the interior portions of the body of solid carbon-dioxide contained therein, there may be provided a series of partitions 33 having their outer edges welded or otherwise definitely connected to the inner face of the can, and thus serving to receive heat therefrom and transfer such heat into the interior of the can for better distribution to the contained material.

In many cases it will be found that the heat transference into the outer face of the can is excessive, even without the presence of the flanges 32. In such cases of excessive action the can may be slightly heat insulated, as by the use of a thin layer of felt or balsa wood, or by painting with a suitable material, etc.

It is preferred that the dome itself be heat insulated for which purpose I have provided the layer of heat-insulating material 34, such as felt or wool batting, or other special composition material, wrapped around the dome, and held in place as by means of the straps or bands 35. Such a layer of material may be very conveniently applied to domes of cars already in operation, and thus they may be improved without difficulty. It is also preferred that the dome cover 17 be similarly heat insulated, as by means of the layer of material 36.

Assuming that in the case of a tank such as a tank car the level of the gasoline or other liquid within the tank car is at the point of the line 37 in Fig. 2, and also assuming that the can 18 has been filled with solid carbon-dioxide and set into place on the plate 29, and that the cover 17 has been fastened back in place on the dome opening. Under these conditions, the heat within the dome or refrigerator will commence to vaporize the solid carbon-dioxide, which will soon fill the can and commence to overflow down through the central passage 31 thereof without "washing" or "bathing" of the solid carbon dioxide due to inflow of air or gas into the can, since the latter is sealed against such inflow. This carbon-dioxide gas, being very heavy, and much heavier than either air or gasoline vapors, will settle down through the hole 31 of the plate 29, and will go on down into the lower portion of the refrigerator such as onto the top surface of the contained gasoline. As this action takes place the air will be displaced upwards, and said air will be forced up along the walls of the dome to the vent fixture and then out through the delivery vent valve or safety valve from the connection 15. It will be noted that inasmuch as the critical pressure of carbon-dioxide gas is very high, amounting to substantially 73 atmospheres of pressure, the gas pressure within the tank and dome will be increased until the delivery vent valve opens, whereupon said pressure will not increase to any further degree, but will be relieved either continuously or from time to time so as to prevent accumulation of excessive pressure within the tank and dome.

After the foregoing action has continued for some time the air will be completely expelled, at least up to the level of the outlet connection or fixture 15, and thenceforth the further generation of carbon-dioxide vapor will result in delivery of the already warmed and consequently lighter portion of such vapor upwardly adjacent to the wall of the dome and then out through the vent valve, but without other undesirable features than a corresponding loss of said gas. However, inasmuch as such gas represents a delivered amount of refrigeration, and inasmuch as the entrapped air has been previously expelled, such loss is to be expected as a normal and proper function of the operation of the arrangement. Any heat penetrating the walls of the refrigerator or dome will be caught by the upflowing current of carbon dioxide gas and carried directly out through the outlet connection and will not be allowed to penetrate to the interior of the dome or refrigerator.

The absorption of heat into the can with attendant liberation of gaseous carbon-dioxide will continue until all of the solid carbon-dioxide has been vaporized, or until the temperature around the can has been reduced to substantially 110 degrees below zero, Fah. Such latter contingency is unlikely to ever occur, and is not a necessary result to be accomplished, since it is not desired to so excessively reduce the temperature. However, the temperature within the dome or refrigerator will be maintained well below the vaporizing point of gasoline, and therefore any gasoline vapors which rise to the position of the dome will be immediately condensed and will fall back into the body of the tank as a rain or mist, and there will be no loss thereof out through the vent valve. The condensation of such gasoline vapor will represent an absorption of heat units from the gases and vapors within the dome, with a corresponding increase of temperature thereof, or a corresponding demand for cooling effect from the solid carbon-dioxide. It will be found in general that for each pound of solid carbon-dioxide vaporized and heated up to say 60 degrees above zero Fah. there will be condensed substantially more than two pounds of gasoline vapor, with a resulting saving thereof in the form of liquid gasoline at the terminal.

The presence of the body of carbon-dioxide gas within the dome will effectively prevent any loss of gasoline vapor upward therethrough, since manifestly it will be impossible for the gasoline to penetrate through the same except to a very small degree, until after the carbon-dioxide vapor has been largely wasted out from the dome after the liberation of fresh vapors has ceased. Such fact will further prevent loss of gasoline vapors, and will result in a further economy of operation.

Due to the fact that all of the air will be driven out of the space above the gasoline surface it follows that the fire-hazard will be effectively done away with. In fact, as long as there remains a body of carbon-dioxide gas within the dome it will be practically impossible for fire to reach the gasoline, and even in the case of some hot body falling down through the dome and into the body of gasoline there will be no danger from fire due to the fact that the carbon-dioxide cannot support combustion. This desirable feature is also enhanced by the further fact that the carbon-dioxide is much heavier than air and therefore will retain its position on the surface of the gasoline even in case some air should find its way or be trapped within the dome and tank.

In order to better distribute the carbon-dioxide gas towards the side walls of the refrigerator and over the surface of the gasoline within the tank and to cause flow of the gaseous carbon dioxide laterally towards the walls of the dome when said carbon dioxide reaches the lower end of the vertical passage 19, and also to prevent excessive cooling action immediately below the central passage 19 I prefer to place a baffle plate 38 directly below the opening 31 in the plate 29. Said baffle plate, when used, may be conveniently supported from the plate 29 by means of brackets 39 and 40. Also said baffle plate may be deflected into the form shown so that the freshly delivered carbon-dioxide gas will flow freely towards both ends of the tank car, and will be prevented from dropping directly onto the gasoline surface immediately below the opening 31. Furthermore, this arrangement will assist in allowing the air to flow back from the more remote recesses of the body of the tank car, because the freshly generated carbon-dioxide gas will flow naturally and substantially without eddies towards the ends of the tank car, and will thus not seriously interefere with the backflowing air.

A baffle plate when used for deflection and distribution of the decending current of cold gas will also tend to prevent the gasoline or other liquid from splashing up into the dome or into contact with the solid carbon dioxide located therein.

It will be seen that in the case of the structure shown in Figs. 2, 3 and 4 there is provided a refrigerating device including a closed receptacle having in its upper portion a gas delivery outlet together with a closed container for solid carbon dioxide located centrally in the receptacle, and a downwardly extending passage having its upper end communicating with the interior of the upper portion of the container to receive carbon dioxide gas sublimated from the solid carbon dioxide within the container and allow said carbon dioxide gas to flow naturally downward to a point below the container; and there is also means for transferring said carbon dioxide gas laterally to points adjacent to the walls of the receptacle; and it is also evident that the carbon dioxide gas then flows upwardly close to the walls of the receptacle and is finally delivered out through the gas delivery outlet. It is also evident that the carbon dioxide gas so flowing upward close to the walls of the receptacle constitutes a shield to help insulate the body of the dome against the inflow of heat through the walls of the dome since any heat which may flow through the insulation of the dome must also flow through this upflowing body of carbon dioxide gas before such heat can reach the interior of the dome. Thus there is produced an added heat insulating effect and an improved form and construction of refrigerative device. It is also evident that the structure shown in said Figures is such that the gaseous carbon dioxide freshly delivered and sublimated surrounds the still remaining block of solid carbon dioxide which is protected within the container against "washing" or "bathing," and the said carbon dioxide gas overflows a "weir" within the said container and passes downwardly through the aforesaid passage.

Figure 5:
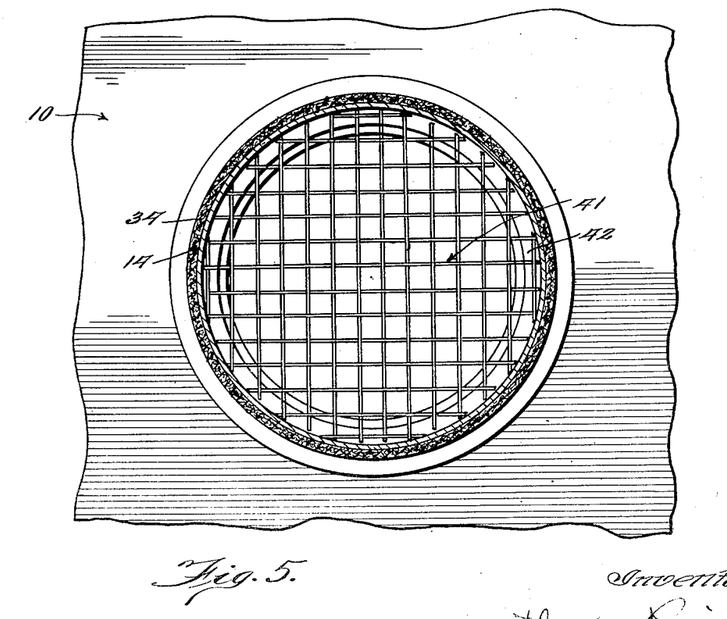
Fig. 5 shows a view similar to that of Fig. 4, but it shows another and modified form of support.

In Fig. 5 I have shown a modified form of construction in which a screen 41 of relatively heavy mesh wire or light rod is used in place of the plate 29 for supporting the solid carbon dioxide. The edge portion of this screen may be rested directly upon a flange 42 located around the lower portion of the interior of the dome. The solid carbon dioxide may in this case be placed directly on the screen itself or within a suitable container which may in turn be placed on the screen and supported thereby. Such a screen when used may be made stiff enough to support the necessary weight of material.

Figure 6:
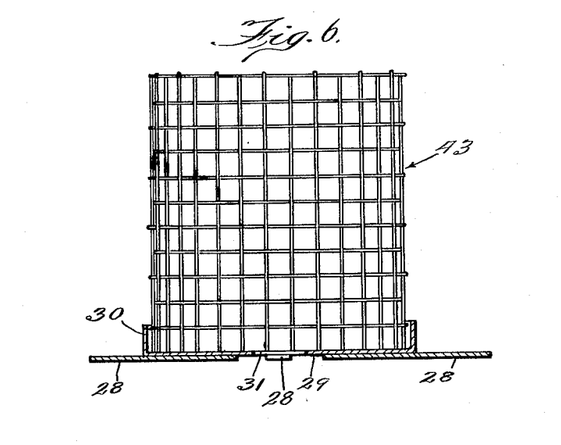
Fig. 6 shows another view similar to that of Fig. 2 but illustrating another form of container in the form of a basket for the solid carbon-dioxide.

In Fig. 6 I have shown a modified form of container for the solid carbon dioxide, such modification consisting in the use of a basket 43 into which the material is placed. This basket may be made of relatively fine mesh material and will adequately support the solid carbon dioxide and retain it against excessive flaking or chipping.

Referring to the form of support shown in detail in Figs. 2 and 4, it is possible to insert or remove such a support through a manhole of size substantially the same as the diameter of the plate 29. This is because it is possible to work the arms 28 through the manhole opening by placing the plate and arms in a more or less vertical position and then passing the arms through the manhole opening while simultaneously rotating the plate 29.

In the modified construction shown in Fig. 5 the screen support 41 may be readily introduced through a manhole opening of much smaller size than the actual diameter of the support 41. This is because the screening can be bent as it is introduced or removed through the manhole opening, and then straightened out afterwards.

In the case of a container such as that shown in detail in Figs. 2 and 3, assuming the diameter of the can 18 to be substantially 18 inches and its height substantially 16 inches and the diameter of the central passage 19 substantially 3 inches, the cubical contents will be approximately 2.20 cubic feet. Allowing for a 10% wastage of space due to inability to completely occupy every angle and corner within the can, a container of this size may readily carry 2 cubic feet of the solid carbon dioxide.

A container of the foregoing size may be readily introduced or removed through a manhole opening of slightly more than 18 inches in diameter. From the foregoing it is evident that a very large amount of benefit may be secured by the use of a container or body of solid carbon dioxide having a size which is not excessive in comparison to the size of a manhole opening in the dome.

The solid carbon dioxide may be pressed or formed into blocks of any desired shape and size. It is therefore possible to form blocks of the desired shape and size to be placed in the containers, whether such containers be cylindrical or otherwise. For example, the blocks of solid carbon dioxide may be made segmental in form to go into the pockets of the container shown in Figs. 2 and 3; or they may be solid cylindrical blocks to go into the basket form of container shown in Fig. 6; or any other suitable form and size intended for the present system and method of use.

While I have herein shown and described only certain embodiments of the features of my present invention, still I do not intend to limit myself thereto except as I may do so in the claims.

I claim:

1. In a tank car for the transportation of materials, said tank car having an upwardly reaching dome in its top portion, inwardly extending bracket in the lower portion of said dome, a cross member extending between said brackets and supported by them, said cross-member being so formed as to leave openings or passages between it and the lower portion of the dome, and being provided with a central opening for the down flow of carbon-dioxide gas, heat insulating material in the dome to protect the same against excessive heat transfer, there being a man-hole opening in the top of the dome, a cover for said man-hole opening and means for removably securing said cover in place in gas tight manner, a can for the accommodation of solid carbon-dioxide removably seated on the cross-member aforesaid, and having a central bottom opening for the discharge of carbon-dioxide gas downwardly, said central bottom opening of the can registering with the opening of the cross-member, a cover for the can aforesaid, a baffle plate located and supported beneath the cross-member and serving to receive the downwardly flowing carbon-dioxide gas from the central opening of the cross-member and divert the same sidewise into the body of the car while allowing return flow of air from the body of the car into the dome, and a vent-valve extending from the dome and serving to discharge gases and air from the dome outwardly into the outer air when the pressure within the dome exceeds a predetermined amount, substantially as described.

2. In a tank car for the transportation of liquids, said tank car having an upwardly reaching dome in its top portion, and having a vent valve in said dome providing for discharge of gases and air outwardly from the dome when pressure within the dome exceeds the outside pressure, and said dome having a man-hole opening in its upper portion and a cover for said opening together with means for securing said cover in place in substantially air and gas tight manner, brackets reaching inwardly in the lower portion of the dome, a cross-support located on said brackets and removable therefrom, and of size and arrangement to permit removal through the man-hole opening, heat-insulating material on the dome and cover to prevent excessive heat transfer between the interior of the dome and the outside atmosphere, said cross-support being so arranged as to permit free flow of carbon-dioxide gas downwardly therethrough into the interior of the car and to allow free flow of the same upwardly into the side portions of the dome and out through the vent valve aforesaid, and a container for solid carbon-dioxide located on the cross-support and allowing carbon-dioxide gas to flow down into the body of the car as said gas is generated by vaporization of the solid carbon-dioxide, said cross-support being so formed and of such size as to permit it to be introduced and removed through the man-hole opening aforesaid, substantially as described.

3. In a tank car for the transportation of liquids, said tank car having an upwardly reaching dome in its top portion and having a vent valve in said dome providing for discharge of gases and air outwardly from the dome when the pressure within the dome exceeds the outside pressure, and said dome having a man-hole opening in its upper portion and a cover for said opening together with means for securing said cover in place in substantially air and gas tight manner a covering of heat insulating material for the dome and cover and serving to prevent excessive transfer of heat between the interior of the dome and the outside air, a container for solid carbon-dioxide, said container being so arranged as to permit downward delivery of carbon-dioxide gas therefrom as said gas is formed, means for supporting said container within the dome in removable manner, said container being of a size and arrangement to permit ready introduction and removal through the man-hole opening aforesaid for the purpose of filling said container with solid carbon-dioxide and to remove the container from interference with free access to the body of the tank car through the dome as needed, and a baffle plate beneath the supporting means aforesaid, substantially as described.

4. In a tank car for the transportation of liquids, said tank car having an upwardly reaching dome in its top portion and having a vent valve in said dome providing for discharge of gases and air outwardly from the dome when the pressure within the dome exceeds the outside pressure, said dome having a man-hole opening in its upper portion and a cover for said opening together with means for securing said cover in place in substantially air and gas tight manner, a covering of heat insulating material for the dome serving to prevent excessive transfer of heat between the interior of the dome and the outside air, a container for solid carbon-dioxide, said container being so arranged as to permit downward delivery of carbon-dioxide gas therefrom as said gas is formed, and means for supporting said container within the dome in removable manner, said container being of a size and arrangement to permit ready introduction and removal through the man-hole opening aforesaid for the purpose of filling said container with solid carbon-dioxide and to remove the container from interference with free access to the body of the tank car through the dome as needed, substantially as described.

5. In a tank car for the transportation of liquids, said tank car having an upwardly reaching dome in its top portion and having a vent valve in said dome providing for discharge of gases and air outwardly from the dome when the pressure within the dome exceeds the outside pressure, and said dome having a man-hole opening in its upper portion and a cover for said opening together with means for securing said cover in place in substantially air and gas tight manner, a container for solid carbon-dioxide within the dome, said container being so arranged as to permit downward delivery of carbon-dioxide gas therefrom into the interior of the tank car as said gas is formed, and to permit return flow of air and gas from the interior of the tank car into the dome as displaced by said downwardly flowing freshly generated carbon-dioxide gas, to thereby permit said returning air and gas to flow into the dome and thence through the vent valve to the outside air, and means for supporting said container within the lower portion of the dome in removable fashion and to permit the flow of gases and air as aforesaid, said container being of a size and form to permit insertion and removal of the container through the man-hole opening aforesaid, substantially as described.

6. In a tank car for the transportation of liquids, said tank car having an upwardly reaching dome in its top portion and having a vent valve in said dome providing for discharge of gases and air outwardly from the dome when the pressure within the dome exceeds the outside pressure, and said dome having a man-hole opening in its upper portion and a cover for said opening together with means for securing said cover in place in substantially air and gas tight manner, a support within the lower portion of the dome for supporting a body of solid carbon-dioxide above the normal level of the liquid within the body of the tank car, said support being so constituted and formed as to permit ready flow of carbon-dioxide gas from the body of said solid downwardly into the body of the car as said gas is generated, and to allow for return flow of air and gas upwardly from the body of the car into the dome as displaced by the downwardly flowing gas, and a suitable body of solid carbon dioxide upon and supported by said support, substantially as described.

7. In a tank car for the transportation of liquids, said tank car having an upwardly reaching dome in its top portion and having a vent valve in said dome providing for discharge of gases and air outwardly from the dome, and said dome having a man-hole opening and a cover for said opening together with means for securing said cover in place, a suitable body of solid carbon-dioxide within said dome and above the normal level of liquid within the tank car, and means for supporting said body within the dome as aforesaid, substantially as described.

8. In a tank car for the transportation of liquids, said tank car being normally intended for operation with the level of liquid therein at a position to establish an unoccupied space within the upper portion of the tank car, together with a vent valve communicating with said space and permitting the discharge of gases therefrom outwardly to the outside atmosphere, a body of solid carbon dioxide within said space and above the normal level of liquid within the tank car, and means for supporting said body in such position, substantially as described.

9. In a tank car for the transportation of liquids, said tank car being normally intended for operation with the level of liquid therein at a position to establish an unoccupied space within the upper portion of the tank car, a body of solid carbon dioxide within said space and above the normal level of liquid within the tank car, and means for supporting said body in such position, substantially as described.

10. In a tank for the retention of liquids, a dome reaching upwardly from the upper portion of said tank, vent means communicating with said dome and permitting discharge of gases outwardly from the dome to the outside atmosphere when the pressure within the dome exceeds a predetermined amount, a body of solid carbon dioxide within said dome and above the normal level of liquid within the tank, and means for supporting said body in such position, substantially as described.

11. In a tank for the retention of liquids, a dome reaching upwardly therefrom and having its interior in communication with the interior of the tank above the normal level of liquid therein, a body of solid carbon dioxide within said dome and above the level of liquid within the tank, and means for supporting said body in such position, substantially as described.

12. In a tank for the retention of liquids, said tank being normally intended for use with the level of liquid at a position to leave an unoccupied space in direct communication with the liquid surface, a body of solid carbon dioxide within said space and above the normal level of the liquid, and means for supporting said body in such position, substantially as described.

13. Means for reducing evaporation of highly volatile and inflammable liquids in a tank car, and for reducing fire hazard thereof, comprising a body of solid carbon dioxide within the upper portion of said tank car and adjacent to the normal position of delivery of vapors therefrom, and serving to generate carbon dioxide gas by evaporation due to heat surrendered by the latent heat of condensation of said vapors, to thereby displace air and vapors from the space immediately above the surface of the liquid and simultaneously recondense said vapors back to the liquid form for reentry into the body of the liquid contained within the tank car, substantially as described.

14. Means for reducing evaporation of highly volatile and inflammable liquids in a container, and for reducing fire-hazard thereof, comprising a body of solid carbon dioxide within the upper portion of said container and at a position where the vapors from the surface of the liquid normally collect, and serving to generate carbon dioxide gas by evaporation due to heat surrendered by the latent heat of condensation of said vapors, to thereby displace air and vapors from the space immediately above the surface of the liquid and simultaneously recondense said vapors back to the liquid form for reentry into the body of the liquid contained within the container, substantially as described.

15. A method of reducing evaporation of highly volatile and inflammable liquids contained within containers, and for reducing the fire-hazard thereof, which consists in placing a body of solid carbon dioxide within a space above the normal level of such liquid within such container, and subjecting said body to the heat within said space and liberated by vapors within said space, to thereby evaporate carbon dioxide gas from said body with corresponding absorption of latent heat liberated by condensation of the vapors, to thereby cool said space, recondense the vapors, and fill said space with gaseous carbon dioxide, substantially as described.

16. In a tank car for the transportation of liquid, said tank having an upwardly reaching dome in its central top portion and having a vent valve in said dome providing for discharge of gas and air outwardly from the dome when the pressure within the dome exceeds the outside pressure, said dome having a manhole opening in its upper portion and a cover for said opening together with means for securing said cover in place in a substantially air and gas tight manner, a covering of heat insulating material for the dome serving to prevent excessive transfer of heat between the interior of the dome and the outside air, and means located within the dome for cooling the interior of the dome substantially as described.

17. A refrigerating apparatus including in combination a heat insulated receptacle having in its upper portion a gas delivery outlet, a closed container for solid carbon dioxide in the upper central portion of said receptacle, said container having a substantially gas tight top closure preventing entrance of air or gas into the top of said container during the refrigerating operation of the device, a passage in alignment with said container and having its upper end in communication with the interior of the container aforesaid, the passage leading downwardly therefrom to transfer gaseous carbon dioxide evolved within the container from the interior of the container to a point below the container, and means for thereafter diverting the carbon dioxide gas sidewise towards the walls of the receptacle, whereby the gaseous carbon dioxide evolved within the container flows downwardly through said passage, thence sidewise, and thence upwards along the walls of the receptacle to the gas delivery outlet, substantially as described.

18. A refrigerating apparatus including in combination a receptacle having in its upper portion a gas delivery outlet, a closed container for solid carbon dioxide in the upper central portion of said receptacle, said container having a substantially gas tight top closure preventing entrance of air or gas into the top of said container during the refrigerating operation of the device, a passage in alignment with said container and having its upper end in communication with the interior of the container aforesaid, the passage leading downwardly therefrom to transfer gaseous carbon dioxide evolved within the container from the interior of the container to a point below the container, whereby the gaseous carbon dioxide evolved within the container flows downwardly through said passage, and thence upwards to the gas delivery outlet, substantially as described.

19. A refrigerating apparatus including in combination a receptacle, a closed container for solid carbon dioxide in the upper central portion of said receptacle, said container having a substantially gas tight top closure preventing entrance of air or gas into the top of said container during the refrigerating operation of the device, a passage in alignment with said container and having its upper end in communication with the interior of the container aforesaid, the passage leading downwardly therefrom to transfer gaseous carbon dioxide evolved within the container from the interior of the container to a point below the container, whereby the gaseous carbon dioxide evolved within the container flows downwardly through said passage and thence upwards to the gas delivery outlet, substantially as described.

20. A refrigerating apparatus including in combination a receptacle having in its upper portion a gas delivery outlet, a closed container for solid carbon dioxide in the upper portion of said receptacle, said container having a substantially gas tight top closure preventing entrance of air or gas into the top of said container during the refrigerating operation of the device, a passage leading downwardly from said container and having its upper end in communication with the interior of the container aforesaid, said downwardly leading passage transferring gaseous carbon dioxide evolved within the container from the interior thereof to a point below the container, and means for thereafter diverting the carbon dioxide gas sidewise or laterally, whereby the gaseous carbon dioxide evolved within the container flows downwardly through said passage thence sidewise and thence upwardly to the gas delivery outlet, substantially as described.

21. A refrigerating apparatus including in combination a receptacle, a closed container for solid carbon dioxide in the upper portion of said receptacle, said container having a substantially gas tight top closure preventing entrance of air or gas into the top of said container during the refrigerating operation of the device, a passage leading downwardly from said container and having its upper end in communication with the interior of the container aforesaid, said downwardly leading passage transferring gaseous carbon dioxide evolved within the container from the interior thereof to a point below the container, and means for thereafter diverting the carbon dioxide gas sidewise or laterally, whereby the gaseous carbon dioxide evolved within the container flows downwardly through said passage thence sidewise and thence upwardly, substantially as described.

22. A refrigerating apparatus including in combination a receptacle having in its upper portion a gas delivery outlet, a container for solid carbon dioxide in the upper portion of said receptacle, said container having a substantially gas tight top closure preventing entrance of air or gas into the top of said container during the refrigerating operation of the device, a passage leading downwardly from said container and having its upper end in communication with the interior of the container aforesaid, said downwardly leading passage transferring gaseous carbon dioxide evolved within the container from the interior thereof to a point below the container, and means for thereafter diverting the carbon dioxide gas sidewise, whereby the gaseous carbon dioxide evolved within the container flows downwardly through said passage, thence sidewise, and thence upwardly along the walls of the receptacle to the gas delivery outlet, the container aforesaid communicating with the outlet aforesaid solely through said downwardly leading passage, substantially as described.

23. A refrigerating apparatus including in combination a receptacle having heat insulated walls and having in its upper portion a gas delivery outlet, a container for solid carbon dioxide within said receptacle and of smaller size than the receptacle to thereby leave a gas flow space between the walls of the container and the interior of the heat insulated receptacle, said container having a substantially gas tight top closure preventing entrance of air or gas into the top of said container during the refrigerating operation of the device, a downwardly extending passage for conducting gaseous carbon dioxide evolved within the container, below said container, and means for diverting said gaseous carbon dioxide conducted downwardly sidewise to said gas flow space, whereby carbon dioxide gas evolved within said container flows downwardly to a point below the container, then laterally and then upwardly between the container and the heat insulated wall of the receptacle and is delivered out of the receptacle through said gas delivery outlet, substantially as described.

24. A refrigerating apparatus including in combination a receptacle having heat insulated walls and having a gas delivery outlet, a container for solid carbon dioxide having a downwardly extending passage for conducting gaseous carbon dioxide evolved within the container, below said container, and into the receptacle below the container, said container having a substantially gas tight closure preventing entrance of air or gas into the top of said container during the refrigerating operation of the device, and means at a lower level than the container for diverting said gaseous carbon dioxide conducted downwardly, sidewise to a point close to the heat insulated wall of the receptacle, the gas delivery outlet being at a higher elevation than the lower portion of the downwardly extending passage, whereby carbon dioxide evolved within the container flows downwardly to a lower level than the container, then laterally, and then upwardly closer to the heat insulated wall of the receptacle, and then out through the delivery outlet, substantially as described.

25. A refrigerating apparatus including in combination a receptacle having heat insulated walls and having a gas delivery outlet, a closed container for solid carbon dioxide, a downwardly extending passage having its upper end in communication with the interior of the container and serving to conduct gaseous carbon dioxide evolved within the container, downwardly to a point below the container, the interior of the container when in refrigerating operation having communication solely through said downwardly extending passage, means at a lower level than the container and in conjunction with the downwardly extending passage for conducting the gaseous carbon dioxide sidewise and close to the lower portions of the heat insulated walls of the receptacle, the gas delivery outlet being at a higher elevation than the sidewise conducting means, whereby gaseous carbon dioxide evolved within the container flows downwardly, then sidewise to a point close to the heat insulated walls of the receptacle, then upwardly to the gas delivery outlet, substantially as described.

26. In a tank car for the transportation of liquids, said tank car having an upwardly reaching dome in its top portion and having a vent valve in said dome providing for discharge of gas and air outwardly from the dome, said dome having a manhole opening and a cover for said opening together with means for securing said cover in place, and means located within the dome for cooling the interior of the dome and to generate an inert gas.

27. In a closed tank for the retention of highly volatile and inflammable liquids, said tank being normally intended for use with the level of liquid at a position to leave an unoccupied space in direct communication with the liquid surface and enclosed against the ingress of air, solid carbon dioxide within said space to generate a non-inflammable substantially inert gas within said space and at a substantially reduced temperature.

28. A refrigerative container having enclosed therein a circular gas tight metal container enclosing solid carbon dioxide, said container being formed for escape of gas only by outflow from a higher level than the ordinary level of the solid carbon dioxide contained therein and including a circular conduit which is concentric with the container and extends downwardly and having its upper end open and communicating with the upper interior portion of the container to receive the carbon dioxide gas overflowing from said container to carry and deliver said gas to a point below the container for refrigerating purposes.

29. In a refrigerating apparatus the combination of a refrigerating receptacle which is substantially air and gas tight, a vent to relieve pressure from the interior of the receptacle outwardly, without entrance of air, when the pressure within the receptacle exceeds atmospheric pressure by a predetermined amount, together with means for refrigerating the interior of said receptacle comprising a container for solid carbon dioxide, said container being substantially air and gas tight against ingress or exit of air or gas into or from said container except through a connection for delivery of gaseous carbon dioxide sublimated within said container by absorption of heat, and a conduit extending downwardly from the delivery connection of the container aforesaid, whereby cold gaseous carbon dioxide sublimated within the container is delivered downwardly into the lower portion of the receptacle with consequent displacement of the contained air and lighter gases upwards and through the vent.

THOS. A. BANNING, JR.